BEST AVAILABLE COPY
3819
Reissued
Hannah G. Supplee's
Feb. 1. 1870.
Improvement in
Sewing Mach. Needles.
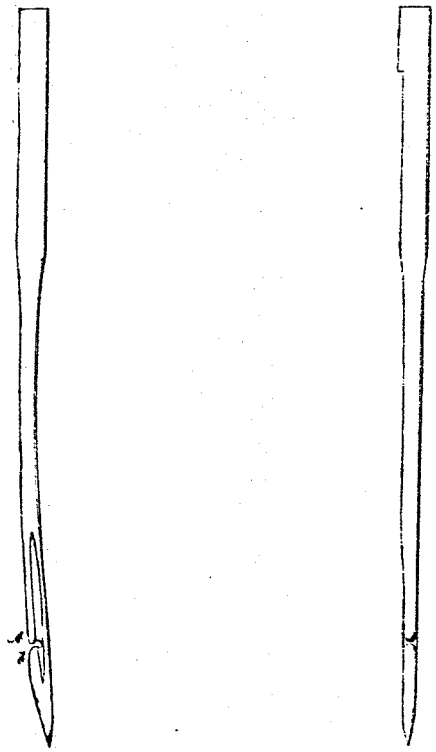
Witnesses
G J Noyes.
E A Clarkson
Inventor
Hannah G. Supplee
By W. T. Beadle & Co
associate
Attorneys

UNITED STATES PATENT OFFICE.

HANNAH G. SUPLEE, OF SAN FRANCISCO, CALIFORNIA.

IMPROVEMENT IN NEEDLES FOR SEWING-MACHINES.

Specification forming part of Letters Patent No. 94,924, dated September 14, 1869; Reissue No. 3,819, date February 1, 1870.

DIVISION B.

*To all whom it may concern:*

Be it known that I, HANNAH G. SUPLEE, of San Francisco, in the county of San Francisco and State of California, have invented a new and useful Improvement in Sewing-Machine Needles; and I do hereby declare that the following is a full and exact description of the same, reference being had to the accompanying drawings, and to the letters of reference marked thereon.

This invention relates to that class of sewing-machine needles which is provided with open eyes for the reception of the thread; and it consists in certain peculiarities of structure, which may be specifically stated as follows:

First, the eye consists of a circular orifice whose diameter corresponds in size with the diameter of the thread to be used.

Second, the opening to this eye through the side of the needle consists of an open inclined slot, the distance between the sides of which is less than the diameter of the eye itself, and the points formed by which, above and below, overlap each other.

Third, the needle itself is provided with a projection or swell between the slotted opening and its point, by means of which the upper point formed by cutting the slot into the eye is prevented from catching in the cloth as the needle passes through it. The manner of constructing my needle will be fully described hereinafter.

In the drawings, Figure 1 represents a side elevation, and Fig. 2 a front elevation, of my improved needle.

To enable others to make my needle I will now proceed to describe the manner in which it is constructed.

The needle-blank is first made of the usual form and in the ordinary manner. I then drill a hole or opening, *a*, in it at the proper point which preferably is located at one side of th perpendicular center line. This opening shoul be of sufficient size only to receive the numbe of thread for which the needle is designed. then cut the inclined opening *b* from the ou side to the eye, making it in width less tha the diameter of the eye. By this operation slight swell or projection, *c*, will be produce below the slot, by means of which the poi upon the upper side of the slot will be pr vented from catching in the cloth as the ne dle passes through it. It will be observed th the points above and below which are produce by the formation of the slot overlap eac other, and thus effectually prevent the acc dental escapement of the thread. The point of course, at the opening should be rounde off smoothly.

Some of the advantages of this constructic are as follows: The needle possesses gre strength, it can be threaded with ease, t thread is not liable to slip out, and neither ca it play in the eye of the needle and becon doubled by the action of the shuttle or hoo The needle itself, also, cannot by any possibili be caught in the cloth.

Having thus fully described my inventio what I claim as new, and desire to secure l Letters Patent, is—

The sewing-machine needle described, ha ing the circular eye *a*, inclined slotted openi *b*, with overlapping points, and projection *c*, constructed and arranged as described, for t purpose set forth.

HANNAH G. SUPLEE. [L. S.]

Witnesses:
C. W. M. SMITH,
E. N. ROBINSON.